United States Patent
Shih et al.

(10) Patent No.: US 9,543,825 B2
(45) Date of Patent: Jan. 10, 2017

(54) POWER CONVERSION APPARATUS AND CONTROL METHOD THEREOF

(71) Applicant: FSP TECHNOLOGY INC., Taoyuan (TW)

(72) Inventors: Yung-Hsiang Shih, Taoyuan (TW); Chang-Hsun Chiang, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 14/644,213

(22) Filed: Mar. 11, 2015

(65) Prior Publication Data
US 2015/0270781 A1    Sep. 24, 2015

(30) Foreign Application Priority Data
Mar. 24, 2014    (TW) .............................. 103110875 A

(51) Int. Cl.
| | |
|---|---|
| H02M 3/335 | (2006.01) |
| H02M 1/44 | (2007.01) |
| H02M 7/217 | (2006.01) |
| H02H 9/00 | (2006.01) |
| H02M 7/12 | (2006.01) |
| H02H 7/125 | (2006.01) |

(52) U.S. Cl.
CPC ............. *H02M 1/44* (2013.01); *H02H 9/001* (2013.01); *H02M 3/335* (2013.01); *H02M 7/125* (2013.01); *H02M 7/2176* (2013.01); *H02H 7/125* (2013.01)

(58) Field of Classification Search
CPC ....................................................... H02M 1/44
USPC ....................................................... 363/21.18
See application file for complete search history.

(56) References Cited

U.S. PATENT DOCUMENTS

| | | | | |
|---|---|---|---|---|
| 4,792,746 A | * | 12/1988 | Josephson ........... | H02M 3/1563 323/290 |
| 2006/0132105 A1 | * | 6/2006 | Prasad ................. | H02M 1/4225 323/222 |

\* cited by examiner

*Primary Examiner* — Matthew Nguyen
*Assistant Examiner* — Trinh Dang
(74) *Attorney, Agent, or Firm* — Jianq Chyun IP Office

(57) ABSTRACT

A power conversion apparatus and control method thereof are provided. The power conversion apparatus includes an output capacitor, an AC-to-DC conversion circuit, a transformer-based auxiliary circuit, an inrush suppression component and a switching circuit. The AC-to-DC conversion circuit is configured to convert an AC power into a DC power. The auxiliary circuit provides a leakage inductance energy. The inrush suppression component provides a first conduction path, and the switching circuit provides a second conduction path. When the switching circuit cuts off the second conduction path in response to the leakage inductance energy, the AC-to-DC conversion circuit conducts the DC power to the output capacitor via the first conduction path. When the switching circuit turns on the second conduction path in response to the leakage inductance energy, the AC-to-DC conversion circuit conducts the DC power to the output capacitor via the second conduction path.

13 Claims, 3 Drawing Sheets

POWER CONVERSION APPARATUS AND CONTROL METHOD THEREOF

CROSS-REFERENCE TO RELATED APPLICATION

This application claims the priority benefit of Taiwan application serial no. 103110875, filed on Mar. 24, 2014. The entirety of the above-mentioned patent application is hereby incorporated by reference herein and made a part of this specification.

BACKGROUND OF THE INVENTION

Field of the Invention

A power conversion technique is provided, and more particularly about a power conversion apparatus and a control method thereof which are able to suppress inrush current.

Description of Related Art

For an electronic apparatus (such as a desktop personal computer and a notebook personal computer) to operate normally, a power conversion apparatus is usually adopted to rectify and filter an AC power to provide a stable DC power for use by the electronic apparatus. An ordinary power conversion apparatus may be composed simply of a full-bridge rectifier and a capacitor having a large capacitance. Therein, the full-bridge rectifier is used for rectifying the received AC power and outputting a DC signal; in addition, the capacitor having the large capacitance is used for filtering the DC signal to provide a stable output voltage for use by a backend circuit or a backend electronic apparatus.

In the structure of the power conversion apparatus, generation of "inrush current" is an issue that has to be overcome. More specifically, at an initial operation of the power conversion apparatus, since the capacitor having the large capacitance has not been charged yet, it is very likely that inrush current will be generated at the moment when the circuit is turned on upon receipt of the AC power by the full-bridge rectifier. Once the energy of the inrush current is too high, serious electromagnetic interference (EMI) occurs and thereby leads to difficulty for the power conversion apparatus to satisfy the standards of safety requirements. It may also be possible that the EMI damages the backend circuit and backend electronic apparatus and/or internal components of the power conversion apparatus.

In view of the above, to suppress the inrush current effectively, a thermal resistor having a Negative Temperature Coefficient (NTC) is usually connected between the full-bridge rectifier and the capacitor having the large capacitance in current power conversion apparatus so as to suppress the inrush current. Therein, the selected thermal resistor needs a relatively higher equivalent high impedance value at a low temperature, so as to dissipate energy of the inrush current. However, power consumption of the power conversion apparatus will be too high with respect to such a solution, and the performance of the power conversion apparatus is thereby reduced.

SUMMARY OF THE INVENTION

A power conversion apparatus and a control method thereof are provided, which not only are able to significantly suppress generation of inrush current, but also effectively reduces power consumption.

The power conversion apparatus of the disclosure includes an output capacitor, an AC-to-DC conversion circuit, a transformer-based auxiliary circuit, an inrush suppression component and a switching circuit. The AC-to-DC conversion circuit is configured to convert an AC power into a DC power. The transformer-based auxiliary circuit provides a leakage inductance energy. The inrush suppression component is connected in series between the AC-to-DC conversion circuit and the output capacitor to provide a first conduction path. The switching circuit is connected across the inrush suppression component to provide a second conduction path and determines whether to turn on the second conduction path in response to the leakage inductance energy. When the switching circuit cuts off the second conduction path in response to the leakage inductance energy, the AC-to-DC conversion circuit conducts the DC power to the output capacitor via the first conduction path. When the switching circuit turns on the second conduction path in response to the leakage inductance energy, the AC-to-DC conversion circuit conducts the DC power to the output capacitor via the second conduction path.

According to an embodiment of the disclosure, the switching circuit cuts off the second conduction path in response to the leakage inductance energy at an initial operation of the power conversion apparatus and turns on the second conduction path in response to the leakage inductance energy after the initial operation.

According to an embodiment of the disclosure, the transformer-based auxiliary circuit includes a transformer and an absorbing circuit. The transformer has a primary winding and a secondary winding. The primary winding is coupled to the output capacitor, and the secondary winding generates an auxiliary power in response to the DC power, wherein the transformer has a leakage inductance. The absorbing circuit is configured to absorb energy generated by the leakage inductance and provides non-absorbed energy of the leakage inductance to the switching circuit as the leakage inductance energy.

According to an embodiment of the disclosure, the absorbing circuit includes a first resistor, a second resistor, a first capacitor and a diode. A first terminal of the first resistor is coupled to the output capacitor and a common-polarity terminal of the primary winding. A first terminal of the second resistor is coupled to the switching circuit, and a second terminal of the second resistor is coupled to a second terminal of the first resistor. First and second terminals of the first capacitor are coupled respectively to the first and second terminals of the first resistor. A cathode terminal of the diode is coupled to the second terminals of the first resistor, the second resistor and the first capacitor, and an anode terminal of the diode is coupled to an opposite-polarity terminal of the primary winding.

According to an embodiment of the disclosure, the inrush suppression component includes at least one resistor. A first terminal of the at least one resistor is coupled to the AC-to-DC conversion circuit, and a second terminal of the at least one resistor is coupled to the output capacitor.

According to an embodiment of the disclosure, the switching circuit includes a transistor. A control terminal of the transistor is coupled to the absorbing circuit, and first and second terminals of the transistor are coupled respectively to the first and second terminals of the resistor, wherein the transistor is turned on in response to the leakage inductance energy and thereby creates the second conduction path.

According to an embodiment of the disclosure, the at least one resistor is a thermal resistor.

According to an embodiment of the disclosure, the AC-to-DC conversion circuit includes a rectification circuit and a power factor correction circuit. The rectification circuit is configured to rectify the AC power and thereby generating a DC signal. The power factor correction circuit is coupled to the rectification circuit for receiving the DC signal, and is controlled to adjust a voltage-current phase relationship of the DC signal for generating the DC power.

According to an embodiment of the disclosure, the power conversion apparatus further includes an electromagnetic interference (EMI) filter circuit. The EMI filter circuit is coupled between the AC power and the rectification circuit for suppressing electromagnetic noise of the AC power and providing the noise-suppressed AC power to the rectification circuit for rectification.

The control method of the power conversion apparatus includes the following steps: converting an AC power into a DC power; receiving a leakage inductance energy from a transformer-based auxiliary circuit; determining whether to turn on a second conduction path connected across an inrush suppression component in response to the leakage inductance energy; conducting the DC power to an output capacitor via a first conduction path provided by the inrush suppression component when the second conduction path is cut off; conducting the DC power to the output capacitor via the second conduction path when the second conduction path is turned on.

According to an embodiment of the disclosure, the step of determining whether to turn on the second conduction path connected across the inrush suppression component in response to the leakage inductance energy includes: cutting off the second conduction path in response to the leakage inductance energy at an initial operation of the power conversion apparatus; and turning on the second conduction path in response to the leakage inductance energy after the initial operation.

According to an embodiment of the disclosure, the step of converting the AC power into the DC power includes: rectifying the AC power and thereby generating a DC signal; and adjusting a voltage-current phase relationship of the DC signal and thereby generating the DC power.

According to an embodiment of the disclosure, the step of receiving the leakage inductance energy from the transformer-based auxiliary circuit includes: absorbing energy generated by the leakage inductance; and providing non-absorbed energy of the leakage inductance as the leakage inductance energy.

Based on the above, the embodiments of the disclosure provide a power conversion apparatus and a control method thereof. The power conversion apparatus is able to output a DC power via a conduction path formed by an inrush suppression component at an initial operation, so as to suppress the inrush current upon booting, and switch the conduction path of the DC power to another conduction path having low impedance to reduce power consumption after the output DC power becomes stable. Herein, the energy required for switching between the conduction paths is provided by a leakage inductance in an existing auxiliary circuit. Therefore, the designer does not need to design an additional control signal to control the switch between the conduction paths, which thereby reduces the complexity of circuit design.

To make the above features and advantages of the present disclosure more comprehensible, several embodiments accompanied with drawings are described in detail as follows.

BRIEF DESCRIPTION OF THE DRAWINGS

Drawings as attached below form part of the specification of the disclosure and illustrate examples and embodiments of the disclosure. The attached drawings explain the principles of the disclosure together with the descriptions in the specification.

DESCRIPTION OF EMBODIMENTS

Figure 1:
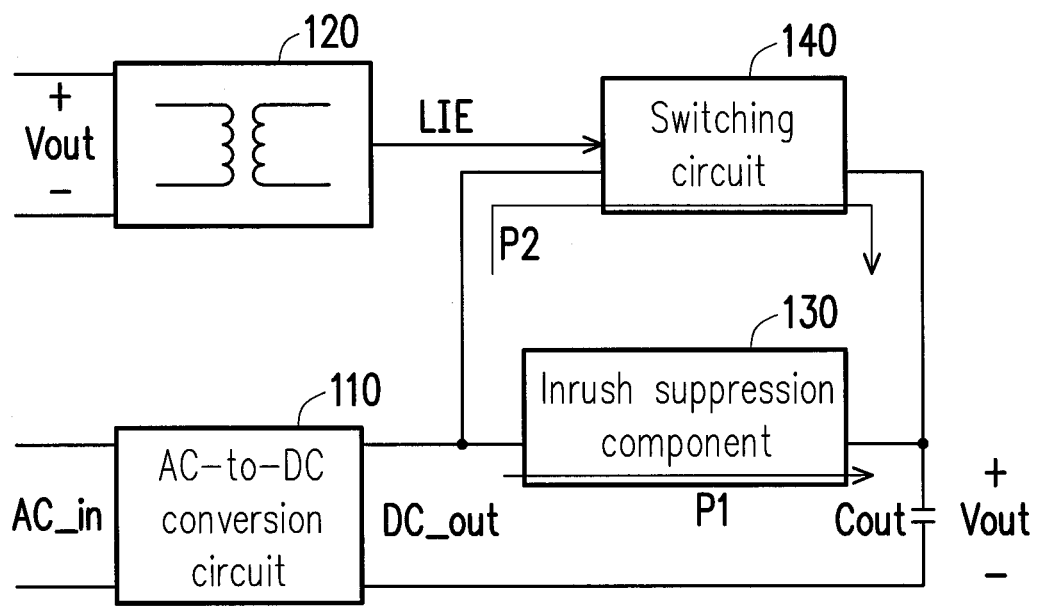
FIG. 1 is a schematic diagram of a power conversion apparatus according to an embodiment of the disclosure.

A power conversion apparatus and a control method thereof are provided in embodiments of the disclosure. The power conversion apparatus and the control method thereof are able to use a leakage inductance energy in an existing circuit to start/activate a protection mechanism to suppress inrush current, so that the power conversion apparatus improves with respect to the issue of the inrush current upon booting without consuming additional power. Since no additional control signal is required to start/activate the protection mechanism, there is no apparent rise in the difficulty of circuit design for designers to incorporate the protection mechanism. In order to make the disclosure more comprehensible, embodiments are described below as the examples to show that the disclosure can actually be realized. Moreover, wherever possible, elements/components/steps with identical reference numerals represent identical or similar parts in the drawings and embodiments.

FIG. 1 is a schematic diagram of a power conversion apparatus according to an embodiment of the disclosure. Referring to FIG. 1, a power conversion apparatus 100 includes an AC-to-DC conversion circuit 110, a transformer-based auxiliary circuit 120, an inrush suppression component 130, a switching circuit 140 and an output capacitor Cout.

In this embodiment, the AC-to-DC conversion circuit 110 is configured to convert an AC power AC_in into a DC power DC_out. Herein, the output capacitor Cout is charged in response to the DC power DC_out provided by the AC-to-DC conversion circuit 110, so as to create a stable output voltage Vout (such as 380V) at both terminals thereof for use by a subsequent circuit or loading (not shown) (for example: providing the output voltage Vout to a PWM-based power conversion circuit (not shown) for power conversion, so as to provide electricity required for operation of the loading).

The auxiliary circuit 120 is a circuit including a transformer structure and configured to provide a specific auxiliary function, such as: a circuit configured to provide standby power or other circuit protection functions (such as overcurrent protection, overvoltage protection or overload protection). Herein, the auxiliary circuit 120 is started/activated in response to the output voltage Vout and provides a leakage inductance energy LIE to the switching circuit 140 based on the leakage inductance of the transformer structure of the auxiliary circuit 120.

The inrush suppression component 130 is connected in series between the AD-to-DC conversion circuit 110 and the output capacitor Cout to provide a first conduction path P1, and the switching circuit 140 bridges to or connected across both terminals of the inrush suppression component 130 to provide a second conduction path P2. The switching circuit 140 is controlled by the leakage inductance energy LIE provided by the auxiliary circuit 120 to determine whether to turn on the second conduction path P2. For instance, when the leakage inductance energy LIE provided by the auxiliary circuit 120 is greater than a default/predetermined value, the switching circuit 140 is enabled in response to the leakage inductance energy LIE to turn on the second conduction path P2; on the contrary, when the leakage inductance energy LIE provided by the auxiliary circuit 120 is smaller than the default/predetermined value, the switching circuit 140 is disabled in response to the leakage inductance energy LIE to cut off the second conduction path P2. Herein, the amount of the leakage inductance energy LIE is in direct proportion to the output voltage Vout (i.e., the leakage inductance energy LIE is raised along with the rise of the output voltage Vout).

It is worth mentioning that the default/predetermined value may be selected by adjusting the parameter configuration of the auxiliary circuit 120 and/or the switching circuit 140, and the disclosure does not limit in this regard. In addition, the inrush suppression component 130 is, for example, an ordinary resistor, a thermal resistor having NTC characteristics or other impedance components capable of suppressing the inrush current. The switching circuit 140 is, for example, a control switch realized by transistor(s).

More specifically, in this embodiment, the AC-to-DC conversion circuit 110 conducts the DC power DC_out to the output capacitor Cout selectively via the first conduction path P1 or the second conduction path P2 according to the enable/disable status of the switching circuit 140, so as to charge the output capacitor Cout. For instance, when the switching circuit 140 cuts off the second conduction path P2 in response to the leakage inductance energy LIE, the AC-to-DC conversion circuit 110 conducts the DC power DC_out to the output capacitor Cout via the first conduction path P1. When the switching circuit 140 turns on the second conduction path P2 in response to the leakage inductance energy LIE, the AC-to-DC conversion circuit 110 conducts the DC power DC_out to the output capacitor Cout via the second conduction path P2 having lower equivalent impedance.

Based on the control characteristics, the power conversion apparatus 100 in this embodiment of the disclosure is able to realize a control mechanism that suppresses the inrush current at the moment of booting via the inrush suppression component 130 at the initial operation, and conducts the DC power DC_out via a conduction path having low impedance after the DC power DC_out becomes stable so as to reduce power consumption.

More particularly, in terms of the operation sequence of booting the power conversion apparatus 100, the leakage inductance energy LIE provided by the auxiliary circuit 120 is not enough to enable the switching circuit 140 when the power conversion apparatus 100 has not been started/activated yet because the output capacitor Cout has not been charged. In other words, the second conduction path P2 is cut off in default when the power conversion apparatus 100 has not been started/activated yet.

At the initial operation after the power conversion apparatus 100 is started/activated, since the second conduction path P2 is cut off in default, the AD-to-DC conversion circuit 110 first conducts the DC power DC_out to the output capacitor Cout via the first conduction path P1, so as to charge the output capacitor Cout and gradually raise the output voltage Vout. Meanwhile, the auxiliary circuit 120 also gradually raises the leakage inductance energy LIE provided thereby in response to the gradually-rising output voltage Vout (but the switching circuit 140 has not turned on the second conduction path P2). In such a configuration, the energy of the inrush current generated by the AC-to-DC circuit 110 at the moment of booting is consumed by the inrush suppression component 130, which thereby suppresses generation of the inrush current.

After the initial operation of the power conversion apparatus 100 (such as a normal operation stage/phase, but not limited thereto), the DC power DC_out output by the AC-to-DC conversion circuit 110 becomes stable, and the leakage inductance energy LIE provided by the auxiliary circuit 120 also rises high enough for the switching circuit 140 to turn on the second conduction path P2. At this point, the switching circuit 140 turns on the second conduction path P2 in response to the leakage inductance energy LIE, so that the AC-to-DC conversion circuit 110 conducts the DC power DC_out to the output capacitor Cout via the second conduction path P2. In such a status, since the DC power DC_out is provided to the output capacitor Cout via the second conduction path P2 having low impedance, the power consumption caused by the conduction path is effectively reduced (as compared to conduction via the first conduction path P1).

It is learned from the above recitation that the power conversion apparatus 100 in this embodiment of the disclosure first cuts off the second conduction path P2 during the booting period (i.e., the initial operation) to conduct the DC power DC_out via the first conduction path P1, followed by conducting the DC power DC_out via the second conduction path P2 after said period. Herein, since the switching circuit 140 is controlled by the leakage inductance energy LIE provided by an existing transformer-based auxiliary circuit 120, the designer does not need to design an additional control signal to control the operation of the switching circuit 140, so that the complexity of circuit design is effectively reduced.

In addition, since the amount of the leakage inductance energy LIE is determined by the output voltage Vout, the switching circuit 140 controlled by the leakage inductance energy LIE is further able to realize a control mechanism that directly turns on the second conduction path P2 in warm booting without repeating first cutting off the second conduction path P2 for a period and then turning on the second conduction path P2. Herein, the circuit design may be more complicated if an additional control signal is adopted to realize such a control mechanism.

It should be noted here that the initial operation refers to a period, in cold booting of the power conversion apparatus 100, (i.e. when the output capacitor Cout has not been charged or the charging has not been completed), from starting the power conversion apparatus 100 (AC power AC_in beginning to provide to the AC-to-DC conversion circuit 110) to turning the second conduction path P2 on by the switching circuit 140. When the power conversion apparatus 100 is started in warm booting, the switching circuit 140 turns on the second conduction path P2 directly in response to the leakage inductance energy LIE. In ordinary applications, the duration of the initial operation is approximately several milliseconds to tens of milliseconds.

Figure 2:
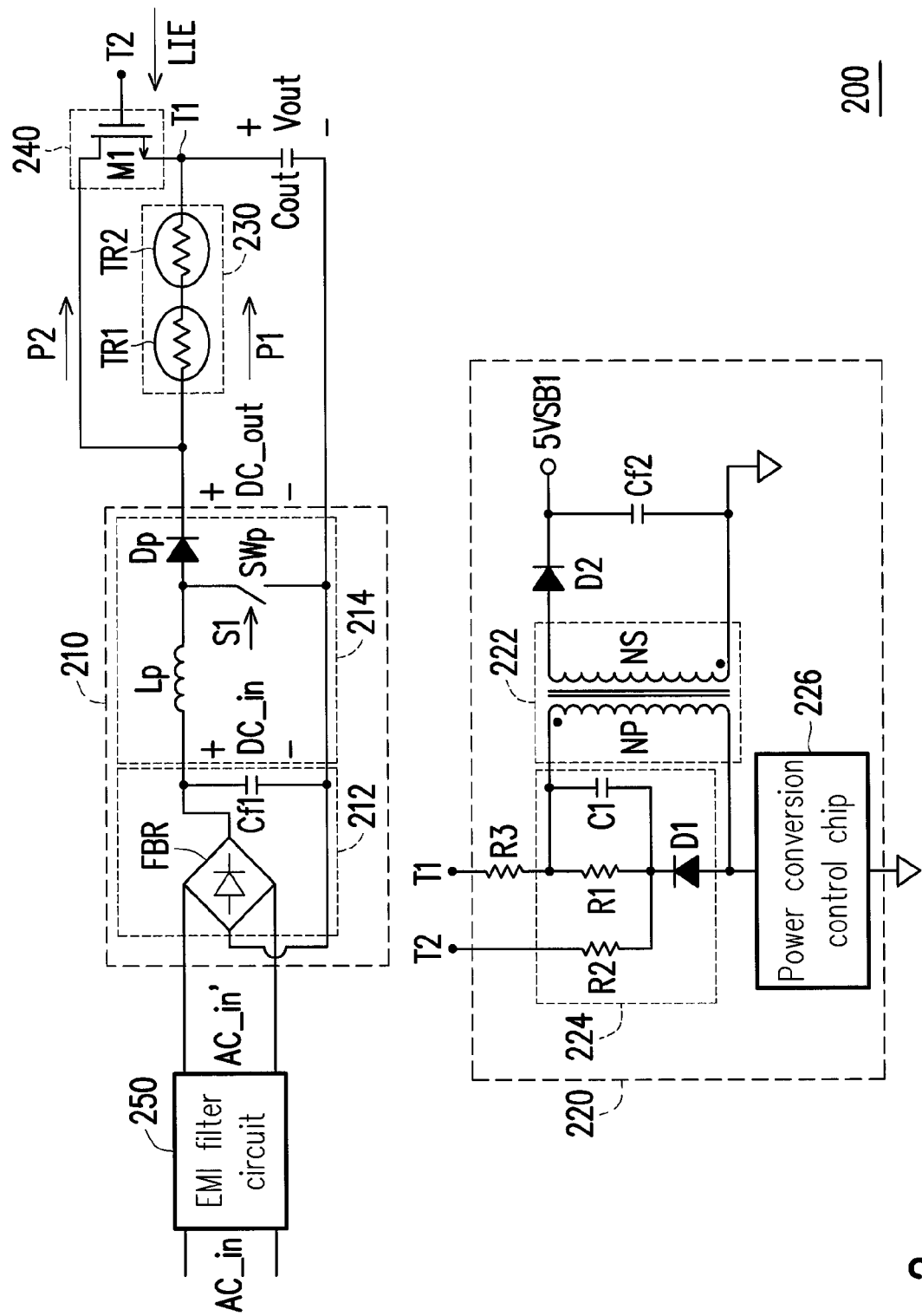
FIG. 2 is a schematic diagram of a circuit structure of the power conversion apparatus according to an embodiment of the disclosure.

To illustrate the embodiment of the disclosure more clearly, FIG. 2 is a schematic diagram of a circuit structure of a power conversion apparatus according to an embodiment of the disclosure. Referring to FIG. 2, a power conversion apparatus 200 includes an AC-to-DC conversion circuit 210, an auxiliary circuit 220, an inrush suppression component 230, a switching circuit 240 and an electromagnetic interference (EMI) filter circuit 250. Herein, the EMI filter circuit 250 is configured to suppress electromagnetic noise of the AC power AC_in and providing the noise-suppressed AC power AC_in' to the AC-to-DC conversion circuit 210 to perform rectification and power factor correction.

According to this embodiment, the AC-to-DC conversion circuit 210 includes a rectification circuit 212 and a power factor correction circuit 214. The rectification circuit 212 is coupled to an output of the EMI filter circuit 250 to receive and rectify the AC power AC_in', and thereby generates a DC signal DC_in. The power factor correction circuit 214 is coupled to an output of the rectification circuit 212 for receiving the DC signal DC_in, and is controlled to adjust a voltage-current phase relationship of the DC signal DC_in for generating the DC power DC_out.

The rectification circuit 212 of this embodiment takes the example of a circuit structure composed of a full-bridge rectifier FBR and a filter capacitor Cf1, while the power factor correction circuit 214 of this embodiment takes the example of a circuit structure composed of an inductor Lp, a power switch SWp and a diode Dp, but the disclosure is not limited thereto. In this embodiment, an input side of the full-bridge rectifier FBR receives the AC power AC_in'. The filter capacitor Cf1 and an output side of the full-bridge rectifier FBR are connected in parallel. A first terminal of the inductor Lp is coupled to a first terminal of the filter capacitor Cf1. An anode terminal of the diode Dp is coupled to a second terminal of the inductor Lp. A first terminal of the power switch SWp is coupled to the second terminal of the inductor Lp and the anode terminal of the diode Dp, a second terminal of the power switch SWp is coupled to a second terminal of the filter capacitor Cf1 and a second terminal of the output capacitor Cout, and a control terminal of the power switch SWp receives a control signal S1 provided by a PWM control chip (not shown).

The auxiliary circuit 220 in this embodiment takes the example of a power conversion circuit for generating an auxiliary power 5VSB1, but the disclosure is not limited thereto. The auxiliary circuit 220 includes a transformer 222, an absorbing circuit 224, a power conversion control chip 226 and other plug-in circuits (such as a resistor R3, a diode D2 and a filter capacitor Cf2), wherein the absorbing circuit 224 is realized by a circuit structure including resistors R1 and R2, a capacitor C1 and a diode D1. More specifically, the auxiliary power 5VSB1 generated by the auxiliary circuit 220 is, for example, a standby power of 5V for serving as a main power supply for the power conversion apparatus 200 when operated in a standby status, so as to reduce power consumption when the power conversion apparatus 200 is standby. The power conversion control chip 226 is, for example, TOPSwitch, used for controlling power conversion operation of the auxiliary circuit 220 as a whole. The absorbing circuit 224 is configured to absorb energy generated by a leakage inductance of the transformer 222, and thereby prevents a transistor disposed in the power conversion control chip 226 from undertaking a voltage peak value that is too high.

The transformer 222 has a primary winding NP and a secondary winding NS. A common-polarity terminal of the primary winding NP is coupled to a first terminal of the output capacitor Cout via the resistor R3 and a node T1, and an opposite-polarity terminal of the primary winding NP is coupled between the absorbing circuit 224 and the power conversion control chip 226. A common-polarity terminal of the secondary winding NS is coupled to a second terminal of the filter capacitor Cf2, and an opposite-polarity terminal of the secondary winding NS is coupled to an anode terminal of the diode D2. A cathode terminal of the diode D2 is coupled to a first terminal of the filter capacitor Cf2. Herein, the transformer 222 generates the auxiliary power 5VSB1 on the secondary winding NS of the transformer 222 in response to the DC power DC_in (or the output voltage Vout).

The absorbing circuit 224 includes the resistors R1 and R2, the capacitor C1 and the diode D1. A first end of the resistor R1 is coupled to the first terminal of the output capacitor Cout via the resistor R3 and the node T1 and is coupled to the common-polarity terminal of the primary winding NP. A first terminal of the resistor R2 is coupled to the switching circuit 240 via a node T2, and a second terminal of the resistor R2 is coupled to a second terminal of the resistor R1. The capacitor C1 is connected in parallel with the resistor R1. The cathode terminal of the diode D1 is coupled to the second terminals of the resistors R1 and R2 and the capacitor C1, and the anode terminal of the diode D1 is coupled to the opposite-polarity terminal of the primary winding NP of the transformer 222 and the power conversion control chip 226.

The inrush suppression component 230 in this embodiment takes the example of thermal resistors TR1 and TR2 that are connected in series (but not limited thereto, namely, an ordinary resistor will do as well). A first terminal of the thermal resistor TR1 is coupled to a cathode terminal of the diode Dp, a second terminal of the thermal resistor TR1 is coupled to a first terminal of the thermal resistor TR2, and a second terminal of the thermal resistor TR2 is coupled to the first terminal of the output capacitor Cout via the node T1. It is worth noting here that the reason why an ordinary resistor (i.e., a resistor whose resistance value is substantially not affected by temperature change) may be selected as the inrush suppression component 230 rather than limited to selecting a thermal resistor is due to the fact that the AC-to-DC conversion circuit 210 no longer conducts energy via the first conduction path P1 having the inrush suppression component 230 when the power conversion apparatus 200 is in normal operation. Therefore, selecting the ordinary resistor does not cause power waste to the power conversion apparatus 200.

The switching circuit 240 in this embodiment takes the example of an N-type transistor M1 (but not limited thereto, namely, a P-type transistor will do as well). A control terminal (gate) of the transistor M1 is coupled to the first terminal of the resistor R2 of the absorbing circuit 224 via the node T2, a first terminal (drain) of the transistor M1 is coupled to the cathode terminal of the diode Dp and the first terminal of the thermal resistor TR1, and a second terminal (source) of the transistor M1 is coupled to the output capacitor Cout and the second terminal of the thermal resistor TR2.

In this embodiment, in addition to absorbing energy generated by the leakage inductance of the transformer 222 to prevent the power conversion control chip 226 from damaging, the absorbing circuit 224 is able to conduct part of non-absorbed energy to the switching circuit 240 as leakage inductance energy LIE via the conduction path created by the resistor R2. This leakage inductance energy LIE is able to create a potential in proportion to the leakage inductance energy LIE in or at the control terminal of the transistor M1, so that the transistor M1 is turned on when the leakage inductance energy LIE exceeds the default/predetermined value. In other words, the absorbing circuit 224 provides the non-absorbed energy of the leakage inductance of the transformer 222 to the switching circuit 240 as the leakage inductance energy LIE. Based thereon, by means of adequately designing characteristic parameters of the transistor M1, the resistors R1 and R2, the capacitor C1 and the diode D1, the transistor M1 is turned on after the initial operation of the power conversion apparatus 200, and thereby turns on the second conduction path P2.

It is worth noting here that in other embodiments, according to the requirements that the designer has for circuit characteristics, the switching circuit 240 may further include a regulator capacitor and a Zener diode coupled between the nodes T1 and T2, but the disclosure is not limited thereto.

Figure 3:
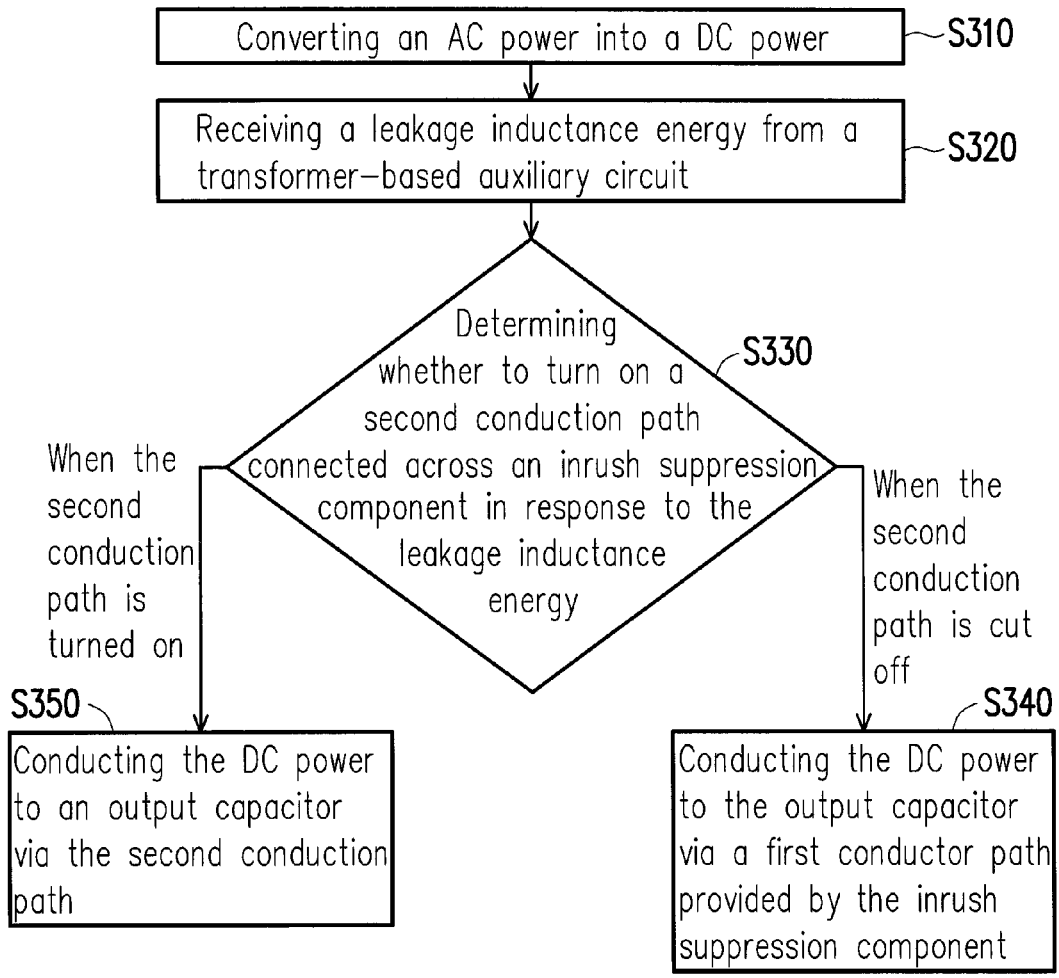
FIG. 3 is a flowchart of steps of a control method of a power conversion apparatus according to an embodiment of the disclosure.

FIG. 3 is a flowchart of steps of a control method of a power conversion apparatus according to an embodiment of the disclosure. A control method of this embodiment is adapted for controlling the power conversion apparatus 100 and 200 as shown in FIGS. 1 and 2. Referring to FIG. 3, the control method of the power conversion apparatus of this embodiment includes the following steps: converting an AC power into a DC power (a step S310); receiving a leakage inductance energy from a transformer-based auxiliary circuit (such as 120 and 220) (a step S320); determining whether to turn on a second conduction path connected across an inrush suppression component (such as 130 and 230) in response to the leakage inductance energy (a step S330); conducting the DC power to an output capacitor (such as Cout) via a first conductor path provided by the inrush suppression component when the second conduction path is cut off (a step S340); and conducting the DC power to the output capacitor via the second conduction path when the second conduction path is turned on (a step S350).

In this embodiment, the step of converting the AC power into the DC power (the step S310) is realized by the following procedures: rectifying the AC power and thereby generating a DC signal; and adjusting a voltage-current phase relationship of the DC signal and thereby generating the DC power. On the other hand, the step of receiving the leakage inductance energy from the transformer-based auxiliary circuit (the step S320) is realized by the following procedures: absorbing energy generated by the leakage inductance of the transformer (such as 222); and providing non-absorbed energy of the leakage inductance as the leakage inductance energy. In addition, the step of determining whether to turn on the second conduction path connected across the inrush suppression component in response to the leakage inductance energy (the step S330) is realized by the following procedures: cutting off the second conduction path in response to the leakage inductance energy at an initial operation of the power conversion apparatus; and turning on the second conduction path in response to the leakage inductance energy after the initial operation.

Herein, the control method in the embodiment of FIG. 3 is sufficiently supported and taught by the descriptions about the embodiments of FIGS. 1 and 2, and therefore similar or repeated parts are not described again here.

To sum up the above, the embodiments of the disclosure provide a power conversion apparatus and a control method thereof. The power conversion apparatus is able to output a DC power via a conduction path formed by an inrush suppression component at an initial operation, so as to suppress the inrush current upon booting, and switch the conduction path of the DC power to another conduction path having low impedance to reduce power consumption after the output DC power becomes stable. Herein, the energy required for switching between the conduction paths is provided by a leakage inductance in an existing auxiliary circuit. Therefore, the designer does not need to design an additional control signal to control the switch of the conduction path, which thereby reduces complexity of the circuit design.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A power conversion apparatus, comprising:
    an output capacitor;
    an AC-to-DC conversion circuit, configured to convert an AC power into a DC power;
    a transformer-based auxiliary circuit, providing a leakage inductance energy;
    an inrush suppression component, connected in series between the AC-to-DC conversion circuit and the output capacitor to provide a first conduction path; and
    a switching circuit, connected across the inrush suppression component to provide a second conduction path, and determining whether to turn on the second conduction path in response to the leakage inductance energy,
    wherein the AC-to-DC conversion circuit conducts the DC power to the output capacitor via the first conduction path when the switching circuit cuts off the second conduction path in response to the leakage inductance energy,
    wherein the AC-to-DC conversion circuit conducts the DC power to the output capacitor via the second conduction path when the switching circuit turns on the second conduction path in response to the leakage inductance energy, and
    wherein the transformer-based auxiliary circuit comprises an absorbing circuit to absorb energy generated by a leakage inductance and provide non-absorbed energy of the leakage inductance to the switching circuit as the leakage inductance energy.

2. The power conversion apparatus according to claim 1, wherein the switching circuit cuts off the second conduction path in response to the leakage inductance energy at an initial operation of the power conversion apparatus, and the switching circuit turns on the second conduction path in response to the leakage inductance energy after the initial operation.

3. The power conversion apparatus according to claim 1, wherein the transformer-based auxiliary circuit further comprises:
    a transformer, having a primary winding and a secondary winding, the primary winding being coupled to the output capacitor, and the secondary winding generating an auxiliary power in response to the DC power, wherein the transformer has the leakage inductance.

4. The power conversion apparatus according to claim 1, wherein the AC-to-DC conversion circuit comprises:
    a rectification circuit, configured to rectify the AC power and generate a DC signal accordingly; and
    a power factor correction circuit, coupled to the rectification circuit for receiving the DC signal, and being controlled to adjust a voltage-current phase relationship of the DC signal for generating the DC power.

5. The power conversion apparatus according to claim 3, wherein the absorbing circuit comprises:

a first resistor, having a first terminal coupled to the output capacitor and a common-polarity terminal of the primary winding;

a second resistor, having a first terminal coupled to the switching circuit, and a second terminal coupled to a second terminal of the first resistor;

a first capacitor, having a first and a second terminals coupled respectively to the first and second terminals of the first resistor; and a diode, having a cathode terminal coupled to the second terminals of the first resistor, the second resistor and the first capacitor, and an anode terminal coupled to an opposite-polarity terminal of the primary winding.

6. The power conversion apparatus according to claim 3, wherein the inrush suppression component comprises:

at least one resistor, wherein a first terminal of the at least one resistor is coupled to the AC-to-DC conversion circuit, and a second terminal of the at least one resistor is coupled to the output capacitor.

7. The power conversion apparatus according to claim 4, further comprising:

an electromagnetic interference (EMI) filter circuit, coupled between the AC power and the rectification circuit, and configured to suppress electromagnetic noise of the AC power and then provide the noise-suppressed AC power to the rectification circuit for rectification.

8. The power conversion apparatus according to claim 6, wherein the switching circuit comprises:

a transistor, having a control terminal coupled to the absorbing circuit, and a first and a second terminals coupled respectively to the first and second terminals of the at least one resistor, wherein the transistor is turned on in response to the leakage inductance energy and thereby creates the second conduction path.

9. The power conversion apparatus according to claim 6, wherein the at least one resistor is a thermal resistor.

10. A control method of a power conversion apparatus, comprising:

converting an AC power into a DC power;

receiving a leakage inductance energy from a transformer-based auxiliary circuit;

determining whether to turn on a second conduction path connected across an inrush suppression component in response to the leakage inductance energy;

conducting the DC power to an output capacitor via a first conduction path provided by the inrush suppression component when the second conduction path is cut off; and conducting the DC power to the output capacitor via the second conduction path when the second conduction path is turned on, wherein the transformer-based auxiliary circuit comprises an absorbing circuit, and the step of receiving the leakage inductance energy from the transformer-based auxiliary circuit comprises absorbing energy generated by a leakage inductance and providing non-absorbed energy of the leakage inductance as the leakage inductance energy.

11. The control method according to claim 10, wherein the step of determining whether to turn on the second conduction path connected across the inrush suppression component in response to the leakage inductance energy comprises:

cutting off the second conduction path in response to the leakage inductance energy at an initial operation of the power conversion apparatus; and turning on the second conduction path in response to the leakage inductance energy after the initial operation.

12. The control method according to claim 10, wherein the step of converting the AC power into the DC power comprises:

rectifying the AC power and thereby generating a DC signal; and adjusting a voltage-current phase relationship of the DC signal and thereby generating the DC power.

13. The control method according to claim 10, wherein the transformer-based auxiliary circuit further comprises a transformer, and the transformer has the leakage inductance.

\* \* \* \* \*